United States Patent [19]

Lindgren

[11] Patent Number: 4,657,223
[45] Date of Patent: Apr. 14, 1987

[54] VALVE SYSTEM WITH HYDRAULIC POWER TRANSMISSION

[75] Inventor: Nils E. Lindgren, Borlänge, Sweden

[73] Assignee: SSAB Svenskt Stal AB, Stockholm, Sweden

[21] Appl. No.: 883,843
[22] PCT Filed: Jun. 20, 1984
[86] PCT No.: PCT/SE84/00236
  § 371 Date: Jan. 28, 1985
  § 102(e) Date: Jan. 28, 1985
[87] PCT Pub. No.: WO85/00203
  PCT Pub. Date: Jan. 17, 1985

Related U.S. Application Data

[63] Continuation of Ser. No. 709,023, Jan. 28, 1985, abandoned.

[30] Foreign Application Priority Data

Jun. 23, 1983 [SE] Sweden .................... 8303607

[51] Int. Cl.⁴ .................................... B03D 3/00
[52] U.S. Cl. .................... 251/61.2; 251/61; 251/172
[58] Field of Search ............ 251/61, 61.2, 61.4, 251/62, 63.5, 63.6, 140, 172, 33.5 B

[56] References Cited

U.S. PATENT DOCUMENTS

| 798,988 | 9/1905 | Wilkins | 251/61 |
|---|---|---|---|
| 900,511 | 10/1908 | Fulton | 251/61 X |
| 1,090,221 | 3/1914 | McIntyre | 251/61 X |
| 1,279,613 | 9/1918 | Traudt | 251/61 X |
| 1,642,784 | 9/1927 | Luomier | |
| 2,268,086 | 12/1941 | Sanford et al. | 251/61 X |
| 2,578,994 | 12/1951 | Dunaway | 251/61 X |
| 2,832,573 | 4/1958 | Ress | 251/61 X |
| 3,776,267 | 12/1973 | Alley | 251/61.2 X |

FOREIGN PATENT DOCUMENTS

| 2607080 | 10/1976 | Fed. Rep. of Germany . |
|---|---|---|
| 1133487 | 3/1957 | France . |
| 352180 | 12/1972 | Sweden . |
| 400357 | 3/1978 | Sweden . |
| 558269 | 1/1975 | Switzerland . |

Primary Examiner—Larry Jones
Attorney, Agent, or Firm—Watson, Cole, Grindle & Watson

[57] ABSTRACT

A valve system for gas or liquid, comprising a hydraulic power transmission (19) where the pressure of hydraulic fluid is controlled by fluid pressure actuated members (15) and the changes of the fluid pressure actuate operative members (5, 7, 10) of the valve system, where the fluid pressure actuated members and the operative members comprise a tubular expandable bellows (10, 14, 25) with one gable (21) closed and the other (22) connected via tubes (11, 23) or similar to other expandable bellows (10, 14, 25) in the valve system and the thus arisen closed space in filled with hydraulic fluid (24), and that the expandable bellows (10) in the operative member stand in connection with a valve body (5) in a valve tube (1) and that the fluid pressure actuated members (15) is placed outside the valve tube (1). The valve body (5) is movable in the longitudinal direction of the valve tube (1) and in close contact with a seat (3) when the valve system is closed.

8 Claims, 3 Drawing Figures

VALVE SYSTEM WITH HYDRAULIC POWER TRANSMISSION

This application is a continuation of application Ser. No. 709,023, filed Jan. 28, 1985, now abandoned.

The present invention relates to a valve system equipped with closed device for hydraulic power transmission, where the pressure of a closed hydraulic fluid is controlled at one or more points assisted by fluid pressure actuated members and the changes of the fluid pressure actuate one or more operative members of the control system. The invention is for example intended for control and shut-off valves in pipings and also for a so called excess flow valve for automatic closing of a tube or a fluid for example in a position where the pipe has ruptured so that the contents can stream out into the environment and cause damage. The invention is particularly applicable at power transmission through walls which separate for example a gas and a fluid from the environment.

TECHNICAL BACKGROUND

Control valves and shut-off valves are generally provided with a control device in the form of a hand control, which is mounted directly on the valve spindle. A device for remote control operation can be entirely mechanical and for example, be formed of one or more shafts, which are connected to the valve spindle via a cardan joint or be electronic and be formed of an electric motor, which via a gear reduction is connected to the valve spindle, and the motor is controlled, for example, by electrical signals which, via a relay closes the current to the motor. The remote control is actuated for example by the valve being located in a place which cannot be reached without great difficulty inter alia on pipes, located high above the ground and in closed spaces, as for example cisterns. It has also proven difficult to arrange remote controls with lead-ins in for example cisterns in which a fluid or a gas is under pressure and also on long distances where many moving direction of the transmission are demanded.

Quick closing valves to a certain extent have an outstanding position in the applications, where the present invention is advantageous. Quick closing can either be done manually or automatically, e.g., when damage has occurred and it is desired to immediately stop the gas or liquid flow. A complete mechanical excess flow valve is described in Swedish Patent 7413120 and comprises a valve body on a valve push rod mounted in a tube and movable in the longitudinal direction of the tube towards a ring-shaped seat. The push rod is in connection with a spring on the outside of the tube via a link mechanism, where one of the link arms extends through the wall of the tube via a sealing box. When there is a pipe rupture at a point downstream of the excess flow valves in the flow direction, the flow rate in the tube increases and a low pressure arises on the underside of the valve body. When the low pressure causes a force on the valve body, which via the link mechanism comprises the spring, the valve body is displaced towards the seat, and the tube is closed. The size of the spring force is adjustable and thus the excess flow valve can be closed at different flow rates.

A disadvantage with the conventional excess flow valve is that the tightening box in the tube wall as time goes becomes worn and begins to leak. Another disadvantage is that there is no easy way to change the adjustment in the valve using remote control. A further disadvantage is that the valve cannot be opened without great difficulty if it has been closed by mistake. Then the pressure in front of the valve has to be lowered, e.g. by using a special unloading valve before the excess flow valve can be opened again. In the same way another conventional excess flow valve works, which is not adjustable from the outside of the tube but is equipped with a spring, which directly works on the valve body inside the tube.

SUMMARY OF THE INVENTION

It has now surprisingly been proven that it is possible to construct a closed hydraulic power transmission system in which there is no risk for leakage or wear by utilizing a valve apparatus which includes a valve casing and which includes an axially expandable bellows therein, the pressure of the fluid in the bellows being controllable from outside the casing.

The invention will be better understood by reference to the attached drawings, taken in conjunction with the following discussion.

DETAILED DESCRIPTION OF THE INVENTION

Figure 3:
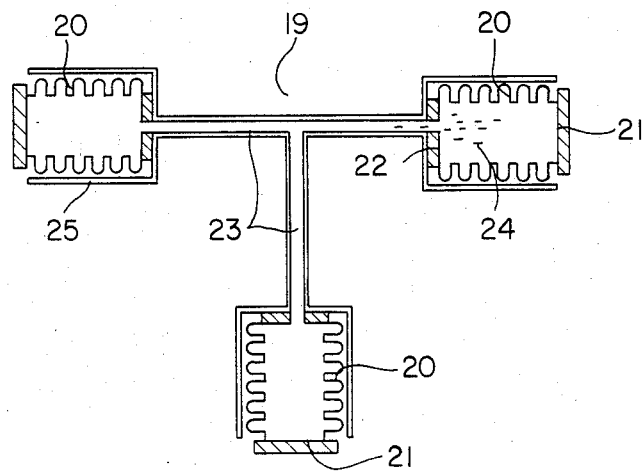
FIG. 3 is a schematic view of a hydraulic power transmission system.

Referring to FIG. 3, a hydraulic power transmission system 19 comprises two or more tubular, expanding bellows 20, each of which has a gable 21 at one end which closes that end and a gable 22 at the other end which has a passageway therethrough, the passageways through all the gables 22 being interconnected by tubes or hoses 23. The closed spaces within the interconnected bellows are filled with a hydraulic fluid 24. The bellows 20, are manufactured for example of metal or rubber and the connecting tubes or hoses 23 are made of materials which do not appreciably change in volume when the pressure rises in the system. By pressing the bellows 20 in its axial direction, the volume thereof is decreased. This causes some or all the other bellows 20 in the hydraulic power transmission system 19 to be extended to obtain the corresponding volume. The extension takes place in the axial direction, which then affects other operative members in the valve system. A condition for good operation is that the bellows 20 are confined in a radial direction so that the movement of the bellows 20 are limited to their axial directions. Therefore guide bushings 25 are usually disposed around the bellows 20 to limit their movements to their axial directions.

Figure 1:
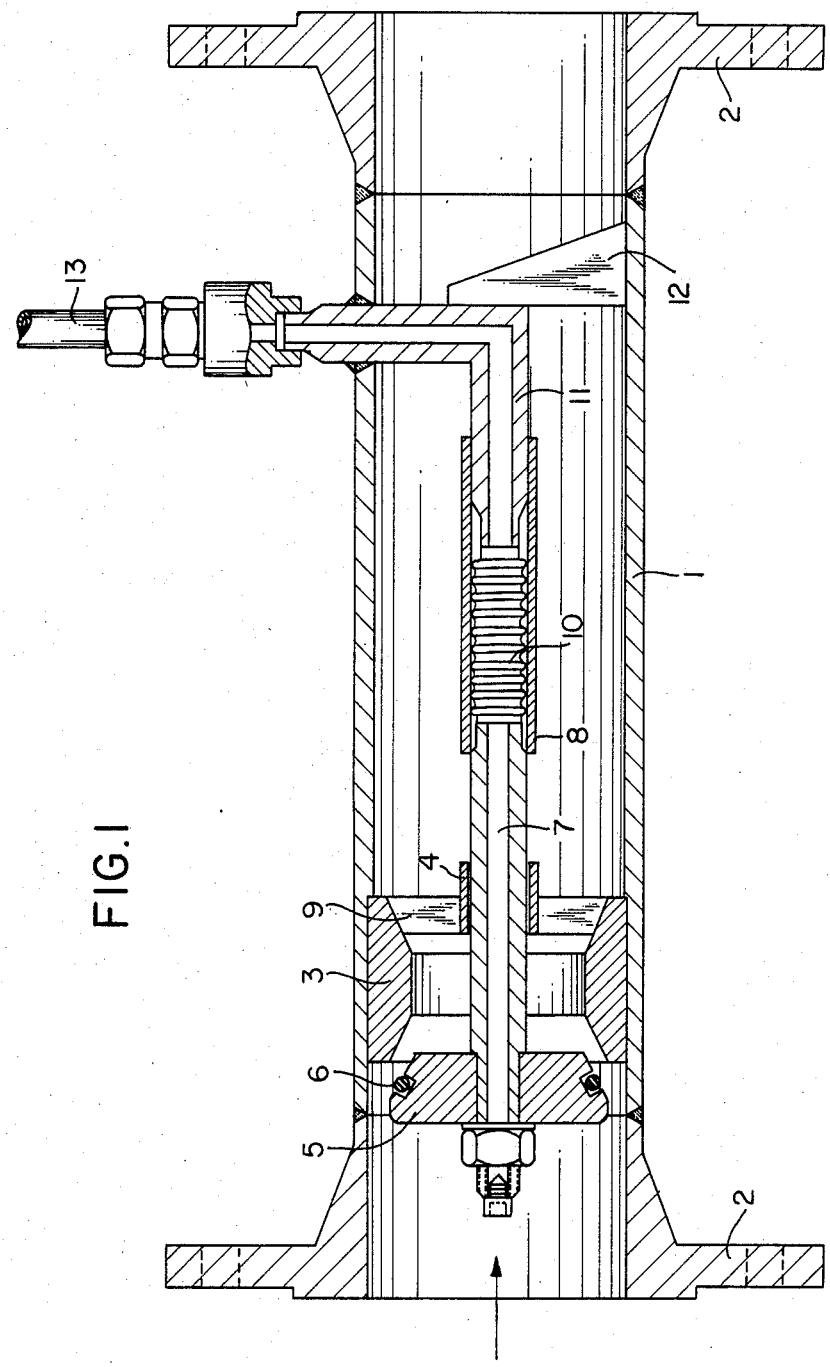
FIG. 1 is a longitudinal section through a portion of a valve apparatus according to the present invention.

Referring now to FIG. 1, the inventive valve apparatus comprises a cylindrical valve tube 1 having two end flanges 2 by which the valve apparatus can be connected to a fluid line having substantially the same tube dimensions as the tube 1. A conical seat 3 is mounted at the one end of the valve tube 1, and extends around the inside of the valve tube 1. A conical valve body 5, adapted to fit against the seat 3, by the tightening ring 6, is mounted at the one end of a push bar 7, which is axially adjustable in a guide sleeve 4 attached on the seat 3 by fins 9. The other end of the push rod 7 is fixedly attached to a steel expansion bellows 10 which is axially movable within a steering guide bushing 8. The other end of the expansion bellows 10 is fixedly attached to a pressure tube 11, which extends from the guide bushing 8, via a tube bend, out through the wall of the valve body 1, to which the pressure tube 11, is welded. The guide bushing 8 also surrounds a part of the pressure tube 11, and is adjustable along the pressure tube 11, which in its turn is fixedly supported by a fastening device 12, which extends from the pressure tube 11, to the inner surface of the valve tube 1, through which axial forces in the pressure tube 11, are taken up when there is movement in the expansion bellows 10. The pressure tube 11 is connected to a pressure bellows 14 located outside the valve tube 1 by a reinforced hose 13.

Figure 2:
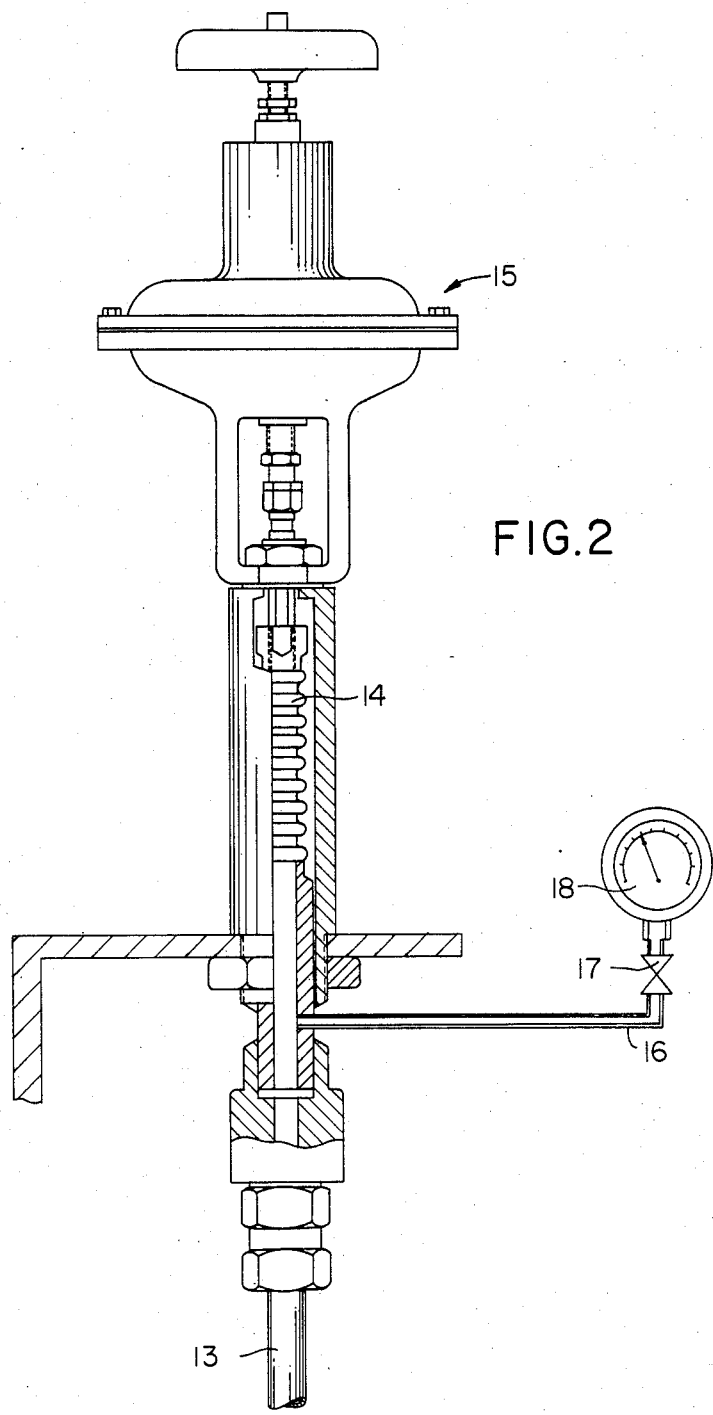
FIG. 2 is a view, partially in section, of the remaining portion of the valve apparatus shown in FIG. 1.

The pressure bellows 14 is connected with a spring control device comprising a pressure limitation device 15, as shown in FIG. 2, which can compress the pressure bellows 14, more or less. The pressure in the pressure tube 11 can be read on a manometer 18, which is in connection with the pressure tube via a manometer tube 16. The manometer tube 16 may be closed by a shut-off valve 17.

The valve apparatus is adjusted so that it closes at a certain fluid flow rate in the valve tube 1 by manually operating the pressure limitation device 15, thus adjusting the pressure in the pressure tube 11 (shown by the manometer 18. If the flow rate should increase in the valve tube 1, for example after a tube rupture, an increasing depression occurs at the rear of the valve body 5, seen from the flow direction, as shown by an arrow on FIG. 1. The pressure on the valve body 5, in direction towards the expansion bellows 10, increases and the power in the push rod 7, compresses the expansion bellows 10, so that the valve body 5, moves towards the seat 3 to effect closure. When the pipe rupture is repaired, the valve body 5 can again be influenced to open using the pressure limitation device 15.

When the flow rate in the valve tube 1 varies, the manometer 15 shows a varying pressure in the pressure tube 11. The reading on the manometer scale 15, will thereby be proportional to the flow rate in the valve tube 1. The manometer 15 can be graduated in flow rate magnitudes. In an alternative embodiment of the invention the manometer 15 can be connected to a registered member which integrates the flow in time and thus the inventive valve apparatus also serves as a flow meter.

The pressure limitation device 15 includes an air-operated membrane and thus this device can also be remotely controlled. At a quick cut-off air pressure is arranged on the side of the membrane, which provides for a compression of the pressure limitation spring in the pressure limitation device 15, while the air pressure is arranged on the opposite side of the membrane at the opening of the valve.

I claim:

1. A valve apparatus for a fluid flow line which can automatically shut off the fluid flow when the flow therethrough exceeds a predetermined value, said valve apparatus comprising a tubular casing which has a first end and a second end and which is connectable to the fluid flow line such that the fluid flowing through the fluid flow line will flow through said first end towards said second end, an annular valve seat positioned within the interior of said tubular casing, a valve body which is cooperable with said annular seat to close and open the interior of said tubular casing, a first expansion bellows positioned in the interior of said cylindrical tubular casing, said expansion bellows having a first end which is operatively connected to said valve body and a second end, a pressure tube extending into said tubular casing, said pressure tube having a first end attached to said second end of said expansion bellows and a second end located outside said cylindrical tube, and a manually adjustable pressure means attached to the second end of said pressure tube to supply a pressure fluid thereto, thus controlling the pressure applied by said first expansion bellows and thereby determining the pressure of fluid flow against the valve body required to move the valve body towards and against or away from said annular valve seat to shut off or open fluid flow through said tubular casing.

2. A valve apparatus as defined in claim 1, including an axially movable push bar positioned in the interior of said tubular casing, said push bar having a first end connected to said valve body and a second end connected to said first expansion bellows.

3. A valve apparatus as defined in claim 1, wherein said pressure means comprises a second pressure bellows and a manually operable pressure limitation device for applying an adjustable pressure on said second pressure bellows.

4. A valve apparatus as defined in claim 3, wherein said pressure means includes a manometer for displaying the pressure of the pressure fluid in said pressure tube.

5. A valve apparatus as defined in claim 3, wherein said pressure limitation device includes a space therein which is divided by a membrane into first and second chambers, one of said chambers being in communication with said second expansion bellows, and both said first and second chambers being connectable with a control device for controlling the fluid pressure therein.

6. A valve apparatus as defined in claim 1, including a support bracket extending into the interior of said tubular casing for supporting said pressure tube in a fixed position.

7. A valve apparatus as defined in claim 1, including a guide bushing mounted within the interior of said tubular casing by said pressure tube, said guide bushing surrounding said first expansion bellows.

8. A valve apparatus as defined in claim 1, including a guide sleeve mounted within the interior of said tubular casing by radially extending fins connected to said annular valve seat, said guide sleeve surrounding said push bar.

* * * * *